(12) United States Patent
Davis et al.

(10) Patent No.: US 7,036,068 B2
(45) Date of Patent: Apr. 25, 2006

(54) ERROR CORRECTION CODING AND DECODING IN A SOLID-STATE STORAGE DEVICE

(75) Inventors: James Andrew Davis, Richmond, VA (US); Jonathan Jedwab, Bristol (GB); David H. McIntyre, Boise, ID (US); Kenneth Graham Paterson, Teddington (GB); Frederick A Perner, Palo Alto, CA (US); Gadiel Seroussi, Cupertino, CA (US); Kenneth K Smith, Boise, ID (US); Stewart R. Wyatt, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 501 days.

(21) Appl. No.: 09/915,194

(22) Filed: Jul. 25, 2001

(65) Prior Publication Data

US 2003/0023923 A1 Jan. 30, 2003

(51) Int. Cl.
*G11C 29/00* (2006.01)

(52) U.S. Cl. ........................ 714/763; 714/752; 714/746
(58) Field of Classification Search ................ 714/763, 714/752, 718, 746, 773, 710; 365/171, 200, 365/158

See application file for complete search history.

(56) References Cited

U.S. PATENT DOCUMENTS

| | | | |
|---|---|---|---|
| 4,069,970 A | 1/1978 | Buzzard et al. | 235/312 |
| 4,209,846 A | 6/1980 | Seppa | 364/900 |
| 4,216,541 A | 8/1980 | Clover et al. | 371/38 |
| 4,458,349 A | 7/1984 | Aichelmann, Jr. et al. | 371/13 |
| 4,933,940 A | 6/1990 | Walter et al. | 371/9.1 |
| 4,939,694 A | 7/1990 | Eaton et al. | 365/200 |
| 5,459,742 A | 10/1995 | Cassidy et al. | 371/40.1 |
| 5,502,728 A | 3/1996 | Smith, III | 395/182.03 |
| 5,504,760 A * | 4/1996 | Harari et al. | 714/763 |
| 5,745,673 A | 4/1998 | Di Zenzo et al. | 395/182.05 |
| 5,848,076 A | 12/1998 | Yoshimura | 37/40.11 |
| 5,852,574 A * | 12/1998 | Naji | 365/158 |
| 5,887,270 A | 3/1999 | Brant et al. | 711/162 |
| 5,987,573 A | 11/1999 | Hiraka | 711/156 |
| 6,166,944 A | 12/2000 | Ogino | 365/97 |
| 6,279,133 B1 | 8/2001 | Vafai et al. | 714/763 |

(Continued)

FOREIGN PATENT DOCUMENTS

| | | |
|---|---|---|
| EP | 0 494 547 A2 | 7/1992 |
| EP | 0 918 334 A2 | 5/1999 |
| EP | 1 132 924 A2 | 10/2000 |

OTHER PUBLICATIONS

Abstract of Japanese Patent No. JP 60007698, published Jan. 16, 1985, esp@cenet.com.
Peterson, W.W. and E.J. Weldon, Jr., *Error–Correcting Codes*, Second Edition, MIT Press, Ch. 1–3, 8 and 9 (1994).
*Reed–Solomon Codes and Their Applications*, S.B. Wicker and V.K. Bhargava, ed., IEEE Press, New York, Ch. 1, 2, 4, and 12 (1994).

*Primary Examiner*—Phung My Chung

(57) ABSTRACT

A magnetoresistive solid-state storage device (MRAM) employs error correction coding (ECC) to form ECC encoded stored data. In a read operation, parametric values are obtained from storage cells 16 of the device and compared to ranges to establish logical bit values, together with erasure information. The erasure information identifies symbols 206 in a block of ECC encoded data 204 which, from the parametric evaluation, are suspected to be affected by physical failures of the storage cells 16. Where the position of suspected failed symbols 206 is known from this erasure information, the ability of a decoder 22 to perform ECC decoding is substantially enhanced.

20 Claims, 5 Drawing Sheets

U.S. PATENT DOCUMENTS

| | | | |
|---|---|---|---|
| 6,430,702 B1 | 8/2002 | Santeler et al. | 714/6 |
| 6,456,525 B1 * | 9/2002 | Perner et al. | 365/171 |
| 2003/0023911 A1 | 1/2003 | Davis et al. | 714/723 |
| 2003/0023922 A1 | 1/2003 | Davis et al. | 714/763 |
| 2003/0023924 A1 | 1/2003 | Davis et al. | 714/763 |
| 2003/0023925 A1 | 1/2003 | Davis et al. | 714/763 |
| 2003/0023926 A1 | 1/2003 | Davis et al. | 714/763 |
| 2003/0023927 A1 | 1/2003 | Jedwab et al. | 714/763 |
| 2003/0023928 A1 | 1/2003 | Jedwab et al. | 714/763 |
| 2003/0172329 A1 | 9/2003 | Davis et al. | 714/710 |
| 2003/0172339 A1 | 9/2003 | Davis et al. | 714/763 |

* cited by examiner

ERROR CORRECTION CODING AND DECODING IN A SOLID-STATE STORAGE DEVICE

BACKGROUND OF THE INVENTION

1. Field of the Invention

The present invention relates in general to a solid-state storage device employing error correction coding (ECC), and in particular relates to a method for error correction decoding of ECC encoded data stored in the device.

2. Description of the Related Art

A typical solid-state storage device comprises one or more two dimensional arrays of storage cells for storing data. Existing semiconductor technologies provide solid-state storage devices suitable for relatively short term storage of data, such as volatile dynamic random access memory (DRAM), or for relatively longer term storage of data such as FLASH and non-volatile static random access memory (SRAM). Recently, a magnetoresistive storage device has been developed as a new type of solid-state storage device. The magnetoresistive solid-state storage device is also known as magnetic random access memory (MRAM). MRAM devices are non-volatile, have relatively low power consumption, and have relatively fast access times, particularly for data write operations, which renders MRAM devices ideally suitable for both short term and long term storage applications.

A problem arises in that solid-state storage devices are subject to physical failure, which can result in an unacceptable loss of stored data. In particular, currently available manufacturing techniques for MRAM devices are subject to limitations and as a result manufacturing yields of acceptable MRAM devices are relatively low. Although better manufacturing techniques are being developed, these tend to increase manufacturing complexity and cost. Hence, it is desired to apply lower cost manufacturing techniques whilst increasing device yield. Further, it is desired to increase cell density formed on a substrate such as silicon, but as the density increases manufacturing tolerances become increasingly difficult to control leading to higher failure rates and lower device yields.

SUMMARY OF THE INVENTION

An aim of the present invention is to provide a method for error correction decoding ECC encoded data stored in a solid state storage device, wherein effectiveness of an ECC scheme is maximised, and/or where overhead associated with error correction coding can be reduced. A preferred aim is to provide such a method where a relatively large number of physical failures can be tolerated.

According to a first aspect of the present invention there is provided a method for error correction decoding ECC encoded data stored in a solid-state storage device having a plurality of storage cells, comprising the steps of: obtaining parametric values from a set of the storage cells; generating a block of stored ECC encoded data, using the obtained parametric values; forming erasure information for the block of stored ECC encoded data, using the obtained parametric values; and error correction decoding the block of stored ECC encoded data with reference to the erasure information.

Preferably, the parametric values are obtained by reading the set of storage cells, and preferably the method is performed as part of a read operation from the storage device.

Preferably, logical values are generated with respect to the obtained parametric values, separate to or combined with forming erasure information from the obtained parametric values. The logical values and/or the erasure information are suitably formed by comparing the obtained parametric values against one or more ranges. The logical values and erasure information can be generated in any suitable form. In one example the logical bit values are determined with hard decisions as to the value of each bit, or else the bit is determined as a failure and erasure information generated accordingly. In a second example, soft decisions are made as to the relative certainty with which each bit is allocated a logical value or declared as a failure.

In the preferred embodiments the device is a solid-state magnetoresistive storage device. Here, the obtained parametric values are suitably a resistance value or a time value for each of the set of storage cells, the obtained parametric values suitably being derived from a sense current applied along row and column control lines to activate each of the desired set of storage cells.

The erasure information preferably identifies one or more symbols in the block of encoded data where a logical value could not be obtained from the parametric values, or is uncertain.

Error correction decoding the block of stored ECC encoded data with reference to the erasure information allows correct values for each symbol to be calculated, and original information to be recovered from the stored ECC encoded data. Suitably, the location of zero or more symbol errors in the block of ECC encoded data is given by the erasure information, which improves ease of calculation of a corrected symbol value.

Optionally, the method includes the step of writing back corrected encoded data to the storage device, suitably using the same set of storage cells. Preferably, this write-back operation is performed selectively, such that corrected encoded data is written back to the storage cells with reference to the erasure information. Preferably, the write-back step comprises selectively not writing back corrected data to storage cells which are determined as affected by physical failures.

The method preferably includes the initial steps of receiving a logical unit of original information which it is desired to store in the device, encoding the original information to form a block of ECC encoded data, and storing the block of ECC encoded data in the array of storage cells. Each logical unit of original information preferably corresponds to a sector such as 512 bytes. Encoding the original information sector forms an encoded sector, which preferably comprises four codewords. Here, each codeword is preferably treated as a separate block of ECC encoded data.

According to a second aspect of the present invention there is provided a solid state storage device, comprising: at least one array of storage cells; and an array controller for obtaining parametric values from a set of the storage cells and generating a block of stored ECC encoded data using the obtained parametric values, including forming erasure information for the block of stored ECC encoded data using the obtained parametric values; and an ECC decoding unit for decoding the block of stored ECC encoded data with reference to the erasure information.

According to a third aspect of the present invention there is provided a magnetoresistive solid-state storage device, comprising: at least one array of magnetoresistive storage cells; an ECC coding unit for receiving original information and forming a block of ECC encoded data; a controller for storing the block of ECC encoded data in the array of storage cells; an array controller for obtaining parametric values from a set of the storage cells and generating a block of stored ECC encoded data using the obtained parametric values, including forming erasure information for the block of stored ECC encoded data using the obtained parametric values; and an ECC decoding unit for decoding the block of stored ECC encoded data with reference to the erasure information.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE PREFERRED EMBODIMENTS

The preferred embodiments of the present invention will be described in detail with particular reference to the example of a magnetoresistive solid-state storage device. However, the present invention can be applied to any suitable form of solid state storage device and is not restricted to MRAM devices.

To assist a complete understanding of the present invention, an example MRAM device will first be described with reference to FIG. 1, including a description of the failure mechanisms found in MRAM devices. The error correction coding (ECC) encoding and decoding methods adopted in the preferred embodiments of the present invention aim to minimise the adverse effects of such physical failures and are described with reference to FIGS. 2 to 5.

Figure 1:
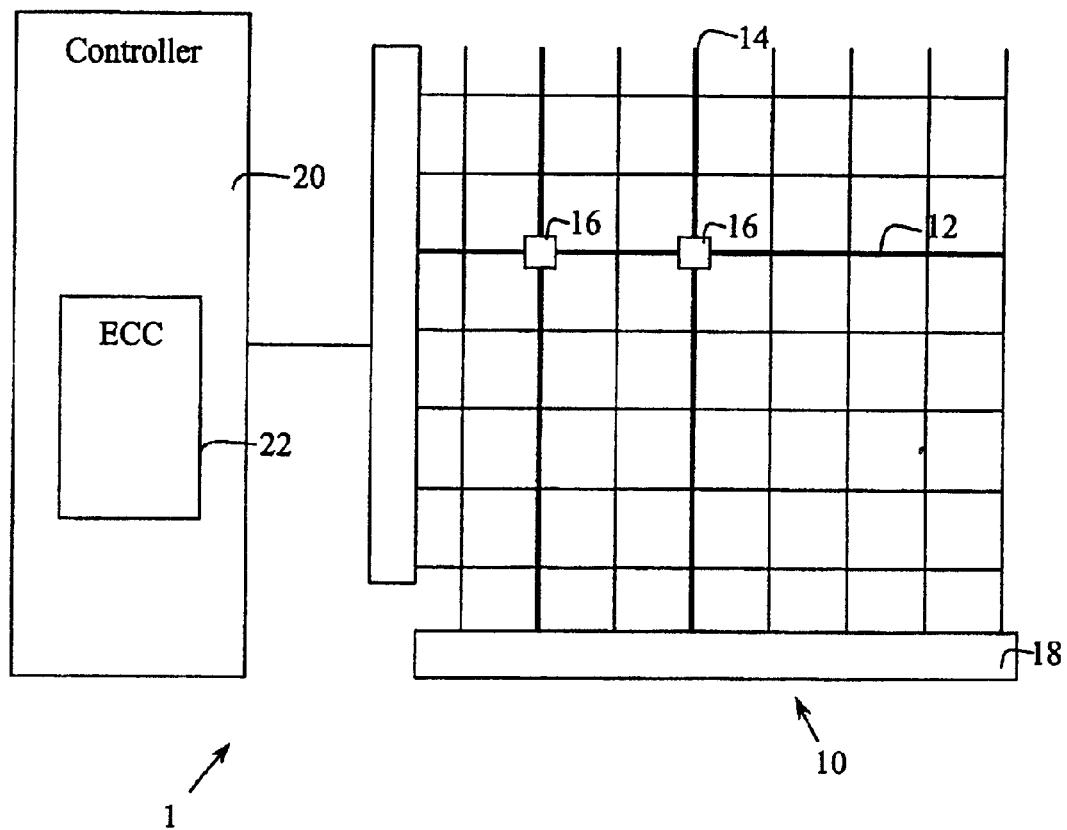
FIG. 1 is a schematic diagram showing a preferred MRAM device including an array of storage cells.

FIG. 1 shows a simplified magnetoresistive solid-state storage device 1 comprising an array 10 of storage cells 16. The array 10 is coupled to a controller 20 which, amongst other control elements, includes an ECC coding and decoding unit 22. The controller 20 and the array 10 can be formed on a single substrate, or can be arranged separately.

In one preferred embodiment, the array 10 comprises of the order of 1024 by 1024 storage cells, just a few of which are illustrated. The cells 16 are each formed at an intersection between control lines 12 and 14. In this example control lines 12 are arranged in rows, and control lines 14 are arranged in columns. One row 12 and one or more columns 14 are selected to access the required storage cell or cells 16 (or conversely one column and several rows, depending upon the orientation of the array). Suitably, the row and column lines are coupled to control circuits 18, which include a plurality of read/write control circuits. Depending upon the implementation, one read/write control circuit is provided per column, or read/write control circuits are multiplexed or shared between columns. In this example the control lines 12 and 14 are generally orthogonal, but other more complicated lattice structures are also possible.

In a read operation of the currently preferred MRAM device, a single row line 12 and several column lines 14 (represented by thicker lines in FIG. 1) are activated in the array 10 by the control circuits 18, and a set of data read from those activated cells. This operation is termed a slice. The row in this example is 1024 storage cells long 1 and the accessed storage cells 16 are separated by a minimum reading distance m, such as sixty-four cells, to minimise cross-cell interference in the read process. Hence, each slice provides up to $l/m=1024/64=16$ bits from the accessed array.

To provide an MRAM device of a desired storage capacity, preferably a plurality of independently addressable arrays 10 are arranged to form a macro-array. Conveniently, a small plurality of arrays 10 (typically four) are layered to form a stack, and plural stacks are arranged together, such as in a 16×16 layout. Preferably, each macro-array has a 16×18×4 or 16×20×4 layout (expressed as width×height× stack layers). Optionally, the MRAM device comprises more than one macro-array. In the currently preferred MRAM device only one of the four arrays in each stack can be accessed at any one time. Hence, a slice from a macro-array reads a set of cells from one row of a subset of the plurality of arrays 10, the subset preferably being one array within each stack.

Each storage cell 16 stores one bit of data suitably representing a numerical value and preferably a binary value, i.e. one or zero. Suitably, each storage cell includes two films which assume one of two stable magnetisation orientations, known as parallel and anti-parallel. The magnetisation orientation affects the resistance of the storage cell. When the storage cell 16 is in the anti-parallel state, the resistance is at its highest, and when the magnetic storage cell is in the parallel state, the resistance is at its lowest. Suitably, the anti-parallel state defines a zero logic state, and the parallel state defines a one logic state, or vice versa. As further background information, EP-A-0 918 334 (Hewlett-Packard) discloses one example of a magnetoresistive solid-state storage device which is suitable for use in preferred embodiments of the present invention.

Although generally reliable, it has been found that failures can occur which affect the ability of the device to store data reliably in the storage cells 16. Physical failures within a MRAM device can result from many causes including manufacturing imperfections, internal effects such as noise in a read process, environmental effects such as temperature and surrounding electromagnetic noise, or ageing of the device in use. In general, failures can be classified as either systematic failures or random failures. Systematic failures consistently affect a particular storage cell or a particular group of storage cells. Random failures occur transiently and are not consistently repeatable. Typically, systematic failures arise as a result of manufacturing imperfections and ageing, whilst random failures occur in response to internal effects and to external environmental effects.

Failures are highly undesirable and mean that at least some storage cells in the device cannot be written to or read from reliably. A cell affected by a failure can become unreadable, in which case no logical value can be read from the cell, or can become unreliable, in which case the logical value read from the cell is not necessarily the same as the value written to the cell (e.g. a "1" is written but a "0" is read). The storage capacity and reliability of the device can be severely affected and in the worst case the entire device becomes unusable.

Failure mechanisms take many forms, and the following examples are amongst those identified:

1. Shorted bits—where the resistance of the storage cell is much lower than expected. Shorted bits tend to affect all storage cells lying in the same row and the same column.
2. Open bits—where the resistance of the storage cell is much higher than expected. Open bit failures can, but do not always, affect all storage cells lying in the same row or column, or both.

3. Half-select bits—where writing to a storage cell in a particular row or column causes another storage cell in the same row or column to change state. A cell which is vulnerable to half select will therefore possibly change state in response to a write access to any storage cell in the same row or column, resulting in unreliable stored data.

4. Single failed bits—where a particular storage cell fails (e.g. is stuck always as a "0"), but does not affect other storage cells and is not affected by activity in other storage cells.

These four example failure mechanisms are each systematic, in that the same storage cell or cells are consistently affected. Where the failure mechanism affects only one cell, this can be termed an isolated failure. Where the failure mechanism affects a group of cells, this can be termed a grouped failure.

Whilst the storage cells of the MRAM device can be used to store data according to any suitable logical layout, data is preferably organised into basic data units (e.g. bytes) which in turn are grouped into larger logical data units (e.g. sectors). A physical failure, and in particular a grouped failure affecting many cells, can affect many bytes and possibly many sectors. It has been found that keeping information about logical units such as bytes affected by physical failures is not efficient, due to the quantity of data involved. That is, attempts to produce a list of all such logical units rendered unusable due to at least one physical failure, tend to generate a quantity of management data which is too large to handle efficiently. Further, depending on how the data is organised on the device, a single physical failure can potentially affect a large number of logical data units, such that avoiding use of all bytes, sectors or other units affected by a failure substantially reduces the storage capacity of the device. For example, a grouped failure such as a shorted bit failure in just one storage cell affects many other storage cells, which lie in the same row or the same column. Thus, a single shorted bit failure can affect 1023 other cells lying in the same row, and 1023 cells lying in the same column—a total of 2027 affected cells. These 2027 affected cells may form part of many bytes, and many sectors, each of which would be rendered unusable by the single grouped failure.

Some improvements have been made in manufacturing processes and device construction to reduce the number of manufacturing failures and improve device longevity, but this usually involves increased manufacturing costs and complexity, and reduced device yields.

The preferred embodiments of the present invention employ error correction coding to provide a magnetoresistive solid-state storage device which is error tolerant, preferably to tolerate and recover from both random failures and systematic failures. Typically, error correction coding involves receiving original information which it is desired to store and forming encoded data which allows errors to be identified and ideally corrected. The encoded data is stored in the solid-state storage device. At read time, the original information is recovered by error correction decoding the encoded stored data. A wide range of error correction coding (ECC) schemes are available and can be employed alone or in combination. Suitable ECC schemes include both schemes with single-bit symbols (e.g. BCH) and schemes with multiple-bit symbols (e.g. Reed-Solomon).

As general background information concerning error correction coding, reference is made to the following publication: W. W. Peterson and E. J. Weldon, Jr., "Error-Correcting Codes", 2$^{nd}$ edition, 12$^{th}$ printing, 1994, MIT Press, Cambridge Mass.

A more specific reference concerning Reed-Solomon codes used in the preferred embodiments of the present invention is: "Reed-Solomon Codes and their Applications", ED. S. B. Wicker and V. K. Bhargava, IEEE Press, New York, 1994.

Figure 2:
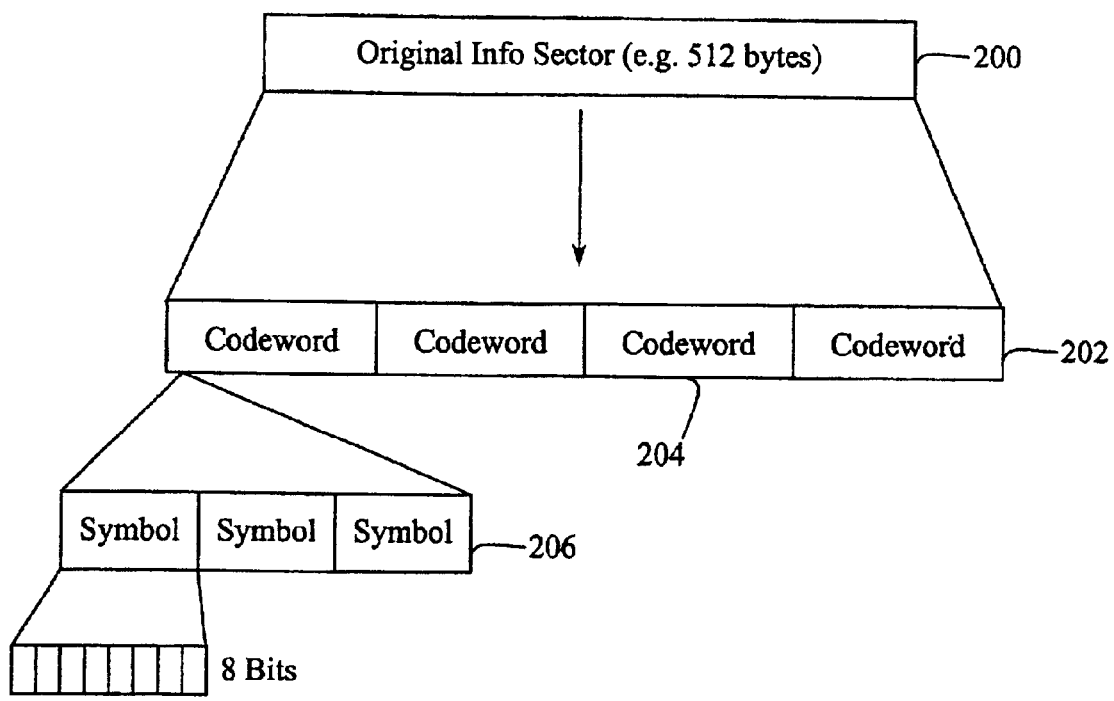
FIG. 2 shows a preferred logical data structure.

FIG. 2 shows an example logical data structure used in preferred embodiments of the present invention. Original information 200 is received in predetermined units such as a sector comprising 512 bytes. Error correction coding is performed to produce a block of encoded data 202, in this case an encoded sector. The encoded sector 202 comprises a plurality of symbols 206 which can be a single bit (e.g. a BCH code with single-bit symbols) or can comprise multiple bits (e.g. a Reed-Solomon code using multi-bit symbols). In the preferred Reed-Solomon encoding scheme, each symbol 206 conveniently comprises eight bits. As shown in FIG. 2, the encoded sector 202 comprises four codewords 204, each comprising of the order of 144 to 160 symbols. The eight bits corresponding to each symbol are conveniently stored in eight storage cells 16. A physical failure which affects any of these eight storage cells can result in one or more of the bits being unreliable (i.e. the wrong value is read) or unreadable (i.e. no value can be obtained), giving a failed symbol.

Error correction decoding the encoded data 202 allows failed symbols 206 to be identified and corrected. The preferred Reed-Solomon scheme is an example of a linear error correcting code, which mathematically identifies and corrects completely up to a predetermined maximum number of failed symbols 206, depending upon the power of the code. For example, a [160,128,33] Reed-Solomon code producing codewords having one hundred and sixty 8-bit symbols corresponding to one hundred and twenty-eight original information bytes and a minimum distance of thirty-three symbols can locate and correct up to sixteen symbol errors. Suitably, the ECC scheme employed is selected with a power sufficient to recover original information 200 from the encoded data 202 in substantially all cases. Very rarely, a block of encoded data 202 is encountered which is affected by so many failures that the original information 200 is unrecoverable. Also, even more very rarely the failures result in a mis-correct, where information recovered from the encoded data 202 is not equivalent to the original information 200. Even though the recovered information does not correspond to the original information, a mis-correct is not readily determined.

It is desired to minimise the probability that original information is unrecoverable from a block of stored encoded data or that a mis-correct occurs. Therefore, the preferred embodiments of the invention aim to improve effective use of an error correction coding scheme, as will be described below.

Figure 3:
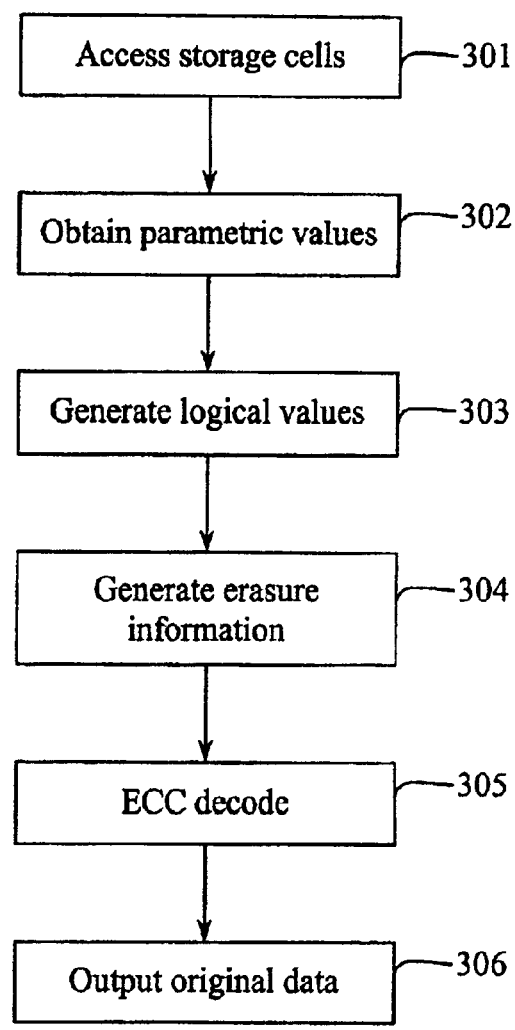
FIG. 3 shows a preferred method for controlling an MRAM device.

FIG. 3 shows a simplified overview of a preferred method for recovering data stored in a solid-state storage device, such as the MRAM device 1 of FIG. 1. Preferably, the stored data is error correction encoded into a format as shown in FIG. 2.

Step 301 comprises accessing a plurality of the storage cells 16 of the solid-state storage device. Preferably, the plurality of storage cells correspond to a block of data, such as a codeword 204. Suitably, a plurality of read operations are performed by accessing the plurality of cells 16 using the row and column control lines 12 and 14.

Step 302 comprises obtaining parametric values, as a result of the access made in step 301. Suitably, a parametric value is determined for each storage cell by measuring a physical property of the device. For an MRAM device suitable properties include a sense current or a response time, each of which can be used to determine a magnetoresistive state of a storage cell. Optionally, more than one parametric value is obtained for each cell.

Step 303 comprises generating logical bit values from the obtained parametric values. Suitably, the sensed parametric value is compared against an expected range (or ranges), and if successful then a logical value is derived such as a binary 1 or 0.

Optionally, when failures occur the steps 301 and 302 are immediately repeated, in the hope of avoiding a transient or random error. However, particularly with current available MRAM devices, a small number of systematic failures will be expected in any particular block of data such as a codeword 204 or an encoded sector 202.

Step 304 comprises generating erasure information. Preferably, erasure information is generated identifying symbols for which no logical value could be obtained, or where the logical value is considered to be unreliable. Ideally, the erasure information is generated with reference to the logical value generation in step 303. The erasure information can be generated directly from the obtained parametric values, or can be obtained indirectly involving one or more intermediate steps.

Step 305 comprises error correction decoding the block of stored encoded data, using the symbol logical values generated in step 303 and taking account of the erasure information generated in step 304. As will be explained below, the erasure information significantly improves the ability to accurately decode the stored encoded data.

Step 306 comprises providing an output from the decoding step 305 as recovered information. In the preferred embodiment, the power of the error correction coding scheme is chosen to balance an overhead of the ECC scheme against the probability of encountering failed symbols. In substantially all practical cases the number of failures is within the power of the decoder to correct, and the original information 200 is recovered and output at step 306. The loss of original information due to an unrecoverable or miscorrected block of stored encoded data is very rare.

The method of FIG. 3 will now be described in more detail, referring to the specific example of the MRAM device 1 of FIG. 1.

In general terms, cell access preferably comprises a read operation, wherein a read voltage is applied along the row and column control lines 12, 14 causing a sense current to flow through selected storage cells 16, which have a resistance determined by parallel or anti-parallel alignment of the two magnetic films. The resistance of a particular storage cell is determined according to a phenomenon known as spin tunnelling and the cells are often referred to as magnetic tunnel junction storage cells. The condition of the storage cell is determined by measuring the sense current (proportional to resistance) or a related parameter such as response time to discharge a known capacitance, which gives one or more parametric values for each of the accessed storage cells. Depending upon the nature and construction of the MRAM device, the read operation may comprise multiple steps or require combined read and rewrite actions.

To generate logical values, and preferably to generate erasure information, the obtained parametric values are compared to one or more ranges. The comparison in almost all cases allows a logical value (e.g. one or zero) to be established for each cell. However, the comparison also conveniently allows at least some forms of physical failure to be identified. For example, it has been determined that, in at least some MRAM devices, a shorted bit failure leads to a very low resistance value in all cells of a particular row and a particular column. Also, open-bit failures can cause a very high resistance value for all cells of a particular row and column. By comparing the obtained parametric values against a range or ranges, cells affected by failures such as shorted-bit and open-bit failures can be identified with a high degree of certainty.

Figure 5:
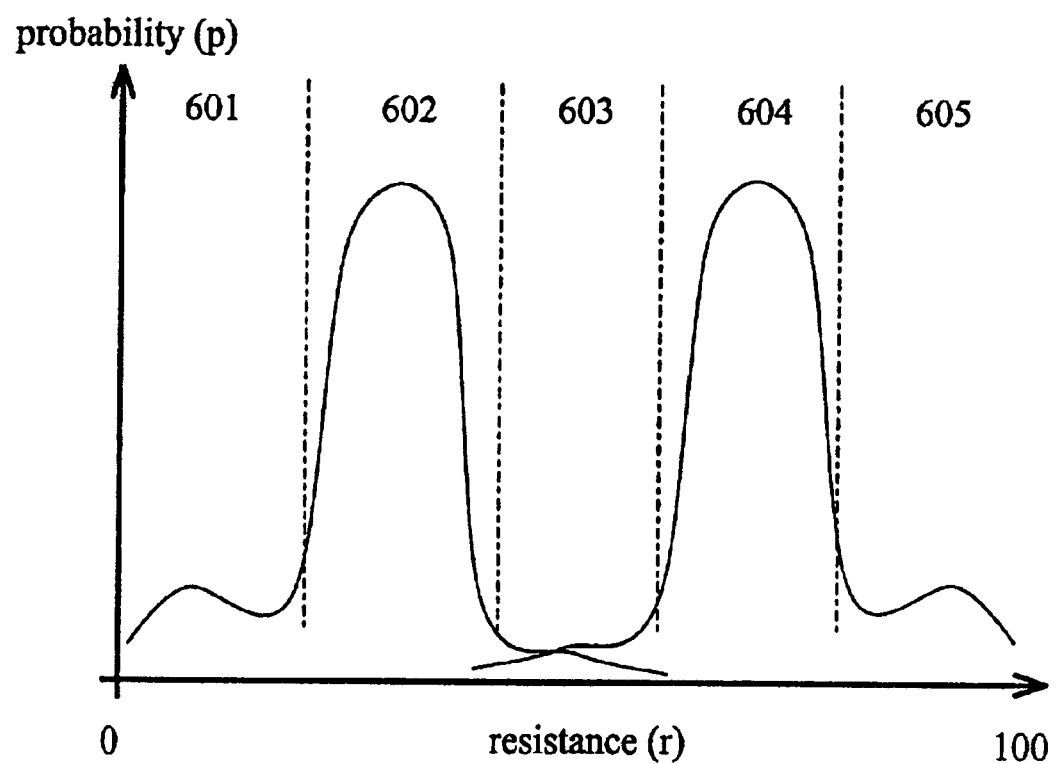
FIG. 5 is a graph illustrating a parametric value obtained from a storage cell of an MRAM device.

FIG. 5 is a graph as an illustrative example of the probability (p) that a particular cell will have a certain parametric value, in this case resistance (r), corresponding to a logical "0" in the left-hand curve, or a logical "1" in the right-hand curve. As an arbitrary scale, probability has been given between 0 and 1, whilst resistance is plotted between 0 and 100%. The resistance scale has been divided into five ranges. In range 601, the resistance value is very low and the predicted range represents a shorted-bit failure with a reasonable degree of certainty. Range 602 represents a low resistance value within expected boundaries, which in this example is determined as equivalent to a logical "0". Range 603 represents a medium resistance value where a logical value cannot be ascertained with any degree of certainty. Range 604 is a high resistance range representing a logical "1". Range 605 is a very high resistance value where an openbit failure can be predicted with a high degree of certainty. The expected ranges shown in FIG. 6 are purely for illustration, and many other possibilities are available depending upon the physical construction of the MRAM device 1, the manner in which the storage cells are accessed, and the parametric values obtained. The range or ranges are suitably calibrated depending, for example, on environmental factors such as temperature, factors affecting a particular cell or cells and their position within array, or the nature of the cells themselves and the type of access employed.

Where a cell is identified as a failure as a result of comparing the sensed parametric value against the range or ranges, then the corresponding portion of encoded data is marked as an erasure. In the currently preferred embodiments, each storage cell 16 stores a single logical bit value representing a binary one or zero, and multiple bits are gathered together to form a symbol 206. Preferably, the erasure information is prepared on the basis that a symbol 206 is declared as an erasure where any one or more of the bits corresponds to a failed storage cell.

The logical values and erasure information can be presented in any suitable form. In one example, the logical bit values are determined with hard decisions as to the value of each bit, or else the bit is determined as a failure and erasure information generated accordingly. In a second example, preferably soft decisions are made as to the relative certainty with which each bit is allocated a logical value or declared as a failure. Ideally, the logical symbol values and erasure information are arranged to form an input (or inputs) to the ECC decoder 22.

As will be familiar to those skilled in the field of ECC, available error correction codes allow a predetermined number of full errors to be corrected (i.e. where the location of a symbol error is unknown and the symbol value is unknown), and twice that predetermined number of erasures (i.e. where the location of a symbol error is known and just the symbol value remains unknown) or a combination of the two. For example, the preferred [160,128,33] Reed-Solomon code is mathematically able to correct up to sixteen full errors or up to thirty-two erasures (or a combination, such as twenty erasures and six full errors). Therefore, the error correction decoding of step 305 is able to correct a greater number of errors using the erasure information generated in step 304, compared with a situation where this erasure information is not available.

In the method discussed above with reference to FIG. 3, parametric evaluation is particularly useful in determining some forms of failures, such as shorted-bit failures and open-bit failures in MRAM devices. By contrast, a systematic failure such as a half select is not so easily detectable using parametric tests, but the effects of such a failure are easily discovered by performing error correction decoding. Therefore, combining parametric testing with error correction coding provides a practical device which is able to take advantage of the considerable benefits offered by the new MRAM technology whilst minimising the limitations of current manufacturing techniques.

Figure 4:
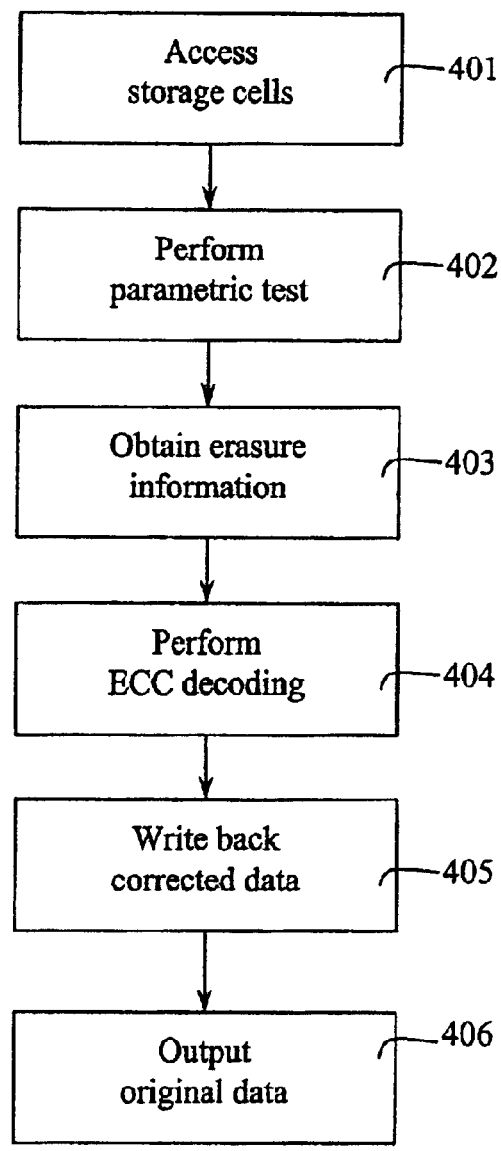
FIG. 4 shows a preferred method for controlling an MRAM device, with optional corrected data write-back.

FIG. 4 shows another preferred method for controlling an MRAM device. Generally, the method is similar to that of FIG. 3, with the addition of step 405 comprising writing back corrected data to the MRAM storage array. In order to avoid error propagation, corrected data obtained by performing ECC decoding in step 404 is written back to the storage cells. Suitably, the encoded data as input to the decoder is compared with an output of the decoder, and any symbols which have been changed (i.e. corrected) by the decoder are written back to the array. However, this write back operation incurs a delay and slows overall operation of the MRAM device. Therefore, the step 405 preferably comprises selectively writing back corrected data. Ideally, corrected data is only written back to good storage cells, and corrected data is not written back to failed storage cells. In the present example, some sets of storage cells (such as corresponding to a symbol 206) are known to contain systematic failures, from the erasure information. Therefore, writing back corrected data to these storage cells is wasteful, because the next read operation using these storage cells will almost certainly encounter the same failures. Preferably, writing back corrected data in step 405 is performed on the basis of the erasure information obtained in step 403. That is, any symbol identified as an erasure in step 403 is not used in the write back of corrected data in step 405.

A magnetoresistive solid-state storage device and methods for controlling such a device have been described. Advantageously, the storage device is able to tolerate a relatively large number of errors, including both systematic failures and transient failures, whilst successfully remaining in operation with no loss of original data, through the use of error correction coding. Simpler and lower cost manufacturing techniques are employed and/or device yield and device density are increased. Error correction coding and decoding allows blocks of data, e.g. sectors or codewords, to remain in use, where otherwise the whole block must be discarded if only one failure occurs. Advantageously, generating erasure information from parametric evaluation of the storage cells allows significantly improved error correction decoding. Error correction overhead in the stored encoded data can be reduced and/or more powerful error correction can be obtained for the same overhead.

The MRAM device described herein is ideally suited for use in place of any prior solid-state storage device. In particular, the MRAM device is ideally suited both for use as a short-term storage device (e.g. cache memory) or a longer-term storage device (e.g. a solid-state hard disk). An MRAM device can be employed for both short term storage and longer term storage within a single apparatus, such as a computing platform.

Although the invention has arisen as a result of problems specific to the environment of MRAM devices, and the nature of failure mechanisms found in such MRAM devices, it has surprisingly been found that the invention is also applicable to other forms of solid state storage device having quite different forms of physical failure and different physical failure probabilities. In each case, it has been found that generating erasure information significantly enhances available error correction coding schemes.

What is claimed is:

1. A method for error correction decoding ECC encoded data stored in a solid-state storage device having a plurality of storage cells, comprising the steps of:
   obtaining parametric values from a set of the storage cells;
   generating a block of stored ECC encoded data, using the obtained parametric values;
   forming erasure information for the block of stored ECC encoded data, using the obtained parametric values; and
   error correction decoding the block of stored ECC encoded data with reference to the erasure information.

2. The method of claim 1, comprising reading the set of storage cells.

3. The method of claim 1, comprising generating logical values with respect to the obtained parametric values.

4. The method of claim 1, comprising comparing the obtained parametric values against a range.

5. The method of claim 1, wherein the device is a magnetoresistive solid-state storage device.

6. The method of claim 5, wherein the obtained parametric values include a resistance value or a time value for each of the set of storage cells, the obtained parametric values being derived from a sense current.

7. The method of claim 1, wherein the forming step comprises comparing the obtained parametric values against a range to infer physical failures amongst the storage cells.

8. The method of claim 1, wherein the generating step comprises generating logical values for a plurality of symbols of the block of encoded data, and the forming step comprises identifying one or more of the symbols as an erasure.

9. The method of claim 8, wherein the erasure information identifies one or more symbols in the block of encoded data where a logical value could not be obtained from the parametric values.

10. The method of claim 8, wherein the erasure information identifies one or more symbols in the block of encoded data where a logical value obtained from the parametric values is considered to be unreliable.

11. The method of claim 8, wherein the decoding step comprises identifying the location of zero or more failed symbols in the block of encoded data, using the erasure information; and replacing each identified failed symbol with a calculated correct value.

12. The method of claim 1, wherein the decoding step comprises identifying the location of zero or more errors in the block of encoded data, with reference to the erasure information; and replacing each identified error with a calculated correct value.

13. The method of claim 1, comprising the step of writing back corrected encoded data to the storage cells.

14. The method of claim 13, wherein the write-back step comprises selectively writing back corrected encoded data to the storage cells, with reference to the erasure information.

15. The method of claim 14, wherein the write-back step comprises selectively not writing back corrected encoded data to storage cells which are determined as affected by physical failures.

16. The method of claim 1, further comprising the steps of:
   encoding a logical unit of original information to form a block of ECC encoded data; and storing the block of ECC encoded data in the array of storage cells;

wherein the decoding step attempts to recover the logical unit of original information from the stored block of ECC encoded data.

17. A solid state storage device, comprising:

at least one array of storage cells; and an array controller for obtaining parametric values from a set of the storage cells and generating a block of stored ECC encoded data using the obtained parametric values, including forming erasure information for the block of stored ECC encoded data using the obtained parametric values; and an ECC decoding unit for decoding the block of stored ECC encoded data with reference to the erasure information.

18. The device of claim 17, wherein the device is a magnetoresistive solid-state storage device.

19. A magnetoresistive solid-state storage device, comprising:

at least one array of magnetoresistive storage cells;

an ECC coding unit for receiving original information and forming a block of ECC encoded data;

a controller for storing the block of ECC encoded data in the array of storage cells;

an array controller for obtaining parametric values from a set of the storage cells and generating a block of stored ECC encoded data using the obtained parametric values, including forming erasure information for the block of stored ECC encoded data using the obtained parametric values; and an ECC decoding unit for decoding the block of stored ECC encoded data with reference to the erasure information.

20. An apparatus incorporating a magnetoresistive storage device according to claim 19.

* * * * *